US008660690B2

(12) United States Patent
Tani et al.

(10) Patent No.: US 8,660,690 B2
(45) Date of Patent: Feb. 25, 2014

(54) ROBOT CONTROL SYSTEM

(75) Inventors: Nobuhiro Tani, Osaka (JP); Yasuhiro Koujina, Osaka (JP); Yuji Nakatsugawa, Osaka (JP)

(73) Assignees: Daihen Corporation, Osaka (JP); Nachi-Fujikoshi Corp., Toyami (JP)

( * ) Notice: Subject to any disclaimer, the term of this patent is extended or adjusted under 35 U.S.C. 154(b) by 73 days.

(21) Appl. No.: 12/864,838

(22) PCT Filed: Mar. 17, 2009

(86) PCT No.: PCT/JP2009/055131
§ 371 (c)(1),
(2), (4) Date: Jul. 27, 2010

(87) PCT Pub. No.: WO2009/119379
PCT Pub. Date: Oct. 1, 2009

(65) Prior Publication Data
US 2011/0010006 A1    Jan. 13, 2011

(30) Foreign Application Priority Data

Mar. 28, 2008 (JP) .................... 2008-086822

(51) Int. Cl.
*B25J 13/00* (2006.01)
(52) U.S. Cl.
USPC .............................. 700/245; 700/264; 901/50
(58) Field of Classification Search
USPC .................... 700/245, 264, 83, 79; 318/568.1–568.25; 901/1–3, 8
See application file for complete search history.

(56) References Cited

U.S. PATENT DOCUMENTS

2002/0166127 A1*  11/2002  Hamano et al. ............... 725/105
2005/0182516 A1*   8/2005  Tsurumi ....................... 700/246
(Continued)

FOREIGN PATENT DOCUMENTS

JP  61-244493  A  10/1986
JP  S61-244493  * 10/1986 ............... B25J 19/06
(Continued)

OTHER PUBLICATIONS

Office Action issued in corresponding Japanese Patent Application No. 2008-086822.

*Primary Examiner* — Helal A Algahaim
*Assistant Examiner* — Charles J Han
(74) *Attorney, Agent, or Firm* — Marsh Fischmann & Breyfogle LLP

(57) ABSTRACT

A robot control system has a portable operating device TP and a robot control device RC. The portable operating device TP is actuated by a rechargeable secondary battery and used to operate a robot R. The robot control device RC is capable of wireless communication with the portable operating device TP and performs automatic operation of the robot R based on teaching data provided by the portable operating device TP. The robot control system causes an emergency stop of the robot R when the wireless communication between the portable operating device TP and the robot control device RC is interrupted. The robot control system further includes a charging device CU, a connection monitoring section 12, and an automatic operation continuing section 11. The charging device CU charges the secondary battery by electrically connecting the portable operating device TP to the robot control device RC. The connection monitoring section 12 monitors whether connection between the portable operating device TP and the robot control device RC through the charging means is established. Even if it is detected that the aforementioned connection is not established when the robot R is in automatic operation, the automatic operation continuing section 11 ends wireless communication without causing an emergency stop of the robot R and continues automatic operation of the robot R solely through the robot control system RC.

3 Claims, 3 Drawing Sheets

(56) References Cited

U.S. PATENT DOCUMENTS

| | | |
|---|---|---|
| 2006/0271209 A1* | 11/2006 | Calcagno .................... 700/19 |
| 2006/0279245 A1* | 12/2006 | Hashimoto et al. ...... 318/568.12 |
| 2007/0143479 A1* | 6/2007 | Putnam et al. ................ 709/226 |
| 2008/0165024 A1* | 7/2008 | Gretton et al. ........... 340/825.22 |
| 2008/0239069 A1* | 10/2008 | Kaplan et al. .................. 348/61 |
| 2009/0009125 A1 | 1/2009 | Matsukuma et al. |
| 2010/0106299 A1* | 4/2010 | Nagata ........................ 700/264 |

FOREIGN PATENT DOCUMENTS

| | | |
|---|---|---|
| JP | 2006-297589 A | 11/2006 |
| JP | 2006-321014 A | 11/2006 |
| JP | 2006-341356 A | 12/2006 |
| WO | WO2006080179 A1 | 8/2006 |
| WO | 2006137239 A1 | 12/2006 |

* cited by examiner

ROBOT CONTROL SYSTEM

TECHNICAL FIELD OF THE INVENTION

The present invention relates to a robot control system that transmits and receives various types of data through wireless communication between a robot control device and a portable operating device.

BACKGROUND OF THE INVENTION

In a conventional robot control system, a robot control device for controlling a robot and a portable operating device performing operations for teaching the robot are electrically connected to each other via a connection cable. The connection cable transmits teaching data or setting data for teaching the robot from the portable operating device to the robot control device. The connection cable also transmits display data from the robot control device to the portable operating device so that the display data is displayed on a display of the potable operating device.

The connection cable is dragged around by the operator who carries the portable operating device when the operator teaches the robot. The connection cable thus may hamper operation by the operator. To solve this problem, as disclosed in, for example, Patent Document 1, wireless communication between a portable operating device and a robot control device has been proposed to facilitate robot operation.

As illustrated in FIG. 3, a robot control system 51 includes a robot R, a portable operating device TP, and a robot control device RC for controlling operation of the robot R. The robot R performs arc welding and spot welding. The portable operating device TP is used by an operator 53 to perform robot teaching. The portable operating device TP and the robot control device RC wirelessly communicate with each other.

The portable operating device TP includes a display section 41 for displaying teaching data, a keyboard 42 through which the teaching data is entered, and an emergency stop switch 43 for causing an emergency stop of the robot R. The portable operating device TP also has a secondary battery serving as a drive source. The teaching data entered through the keyboard 42 is transmitted to the robot control device RC through wireless communication and stored by the robot control device RC. The robot R has a wrist portion having a distal end to which a work tool such as an arc welding torch or a spot welding gun is attached. Typically, the robot R is installed in the space surrounded by a safety fence 52. The robot control device RC automatically operates the robot R based on the entered teaching data. A connection cable 54 electrically connects the robot control device RC and the portable operating device TP to each other when the robot R is in automatic operation. The connection cable 54 is detachably attachable to the portable operating device TP through a connector (not shown). When the portable operating device TP is electrically connected to the connection cable 54, the secondary battery mounted in the portable operating device TP is charged.

With reference to FIG. 4, the portable operating device TP generates transmission data including the teaching data entered by the operator. The portable operating device TP transmits the transmission data to the robot control device RC through a transmission section 72. The robot control device RC receives the data provided by the portable operating device TP through a receiving section 62 as reception data. The robot control device RC transmits transmission data such as display data to the portable operating device TP through a transmitting section 61. The portable operating device TP receives the data provided by the robot control device RC through a receiving section 71 as reception data.

When the emergency stop switch 43 of the portable operating device TP is pressed, the portable operating device TP transmits data indicating that the emergency stop switch 43 has been pressed to the robot control device RC through a transmission section 72. Based on the data sent from the portable operating device TP, the robot control device RC causes an emergency stop of the robot R. In other cases, the robot control device RC causes the emergency stop of the robot R when wireless communication is temporarily interrupted due to noise or insufficient radio field intensity.

The robot control system disclosed in Patent Document 1 further includes detection means (not shown). The detection means detects whether the electrical connection between the portable operating device TP and the robot control device RC through the connection cable 54 is not established. When the robot R is in automatic operation and the detection means detects that the aforementioned electric connection is not established, the robot control system activates an alarm. This prevents interruption of communication between the portable operating device TP and the robot control device RC due to insufficient charging of the secondary battery, which leads to an emergency stop of the robot R and thus interruption of the production line. Further, when the electric connection between the portable operating device TP and the robot control device RC is not established, the robot control system performs wireless communication between the portable operating device TP and the robot control device RC.

As has been described, when automatic robot operation is being carried out and it is detected that the electric connection between the portable operating device and the robot control device is not established, the robot control system disclosed in Patent Document 1 activates an alarm to warn the operator. This prevents an emergency stop of the robot due to insufficient charging of the secondary battery of the portable operating device. Further, even when the aforementioned electric connection is not established, the robot control system disclosed in Patent Document 1 performs wireless communication between the portable operating device TP and the robot control device RC. The automatic operation of the robot R is thus continued even without connecting the portable operating device to the connection cable to charge the secondary battery in accordance with the alarm. However, if the automatic operation of the robot R is continuously performed despite the alarm, the charging amount of the secondary battery of the portable operating device TP decreases as the time elapses. In this case, eventually, an emergency stop signal is generated to stop the production line.

Accordingly, when an alarm is activated, the portable operating device must be connected to the robot control device. Such a connecting operation is troublesome for the operator. Further, the portable operating device is necessary mainly for robot teaching but unnecessary for the automatic operation of the robot. Specifically, in the automatic operation of the robot, it is desirable to switch to wire communication to eliminate the influence of noise or to continue the automatic operation of the robot with the portable operating device disconnected from the robot control system. Further, a portable operating device performing wireless communication has an advantage in that a plurality of robot control systems may be operated through a single portable operating device. However, when a single robot control device has to be connected to a single portable operating device, as in the case of the robot control system disclosed in Patent Document 1, the portable operating device cannot be used to operate other robot control systems.

Patent Document 1: Japanese Laid-Open Patent Publication No. 2006-341356

SUMMARY OF THE INVENTION

Accordingly, it is an objective of the present invention to provide a robot control system that continuously performs automatic robot operation even if an electric connection between a portable operating device and a robot control device has not been established in automatic robot operation.

To achieve the foregoing objective and in accordance with a first aspect of the present invention, a robot control system having a robot, a portable operating device, a robot control device, and emergency stop means is provided. The portable operating device is actuated by a rechargeable secondary battery and used to operate the robot. The robot control device is capable of wirelessly communicating with the portable operating device and performs automatic operation of the robot based on teaching data input by the portable operating device. The emergency stop means that causes an emergency stop of the robot when wireless communication between the portable operating device and the robot control device is interrupted. The robot control system includes charging means, connection monitoring means, and an automatic operation continuing section. The charging means charges the secondary battery by electrically connecting the portable operating device to the robot control device. The connection monitoring means monitors whether an electric connection between the portable operating device and the robot control device through the charging means is established. If the connection monitoring means detects that the electric connection is not established when the robot is in automatic operation, the automatic operation continuing section ends wireless communication without causing an emergency stop of the robot and continues automatic operation of the robot with the portable operating device disconnected from the robot control system.

In this configuration, if it is detected that an electric connection between the portable operating device and the robot control device has not been established when the robot is in automatic operation, the wireless communication is ended and the automatic operation of the robot is continued solely through the robot control device without causing an emergency stop of the robot with the portable operating device disconnected from the robot control system. In this manner, the automatic operation of the robot is continuously performed without having to considering whether or not the portable operating device is connected to the charging device. This improves work efficiency. Further, since the automatic operation of the robot is continued solely through the robot control device without carrying out wireless communication, an emergency stop of the robot, which may be caused by communication noise, does not occur. Also, after having been disconnected from the robot control system, the portable operating device may be used for robot teaching in an additional robot control system.

In the above described robot control system, it is preferable that, if the connection monitoring means detects that the electric connection is not established when the robot is in automatic operation, a power source of the portable operating device is disconnected.

In this configuration, if it is detected that the electric connection between the portable operating device and the robot control device is not established when the robot is in the automatic operation, the power source of the portable operating device is automatically disconnected to prevent the charging amount of the portable operating device from being insufficient.

The above described control system preferably includes radio field intensity monitoring means for monitoring radio field intensity when wireless communication is carried out by the portable operating device and alarm activation means for activating an alarm when the radio field intensity is greater than or equal to a predetermined level.

This configuration includes a radio field intensity monitoring means for monitoring radio field intensity when wireless communication is carried out and an alarm activation means for activating the alarm. An alarm is activated when the radio field intensity is greater than or equal to a predetermined level. Specifically, the radio field intensity monitoring means is arranged in the vicinity of the robot and monitors and measures the radio field intensity of a wireless radio wave generated by the portable operating device. When the portable operating device is in a space surrounded by a safety fence in which the robot is located, for example, the radio field intensity is high compared to a case in which the portable operating device is outside the space surrounded by the safety fence. Accordingly, when the portable operating device is in the space surrounded by the safety fence, an alarm may be first activated to inform the operator of the fact that the portable operating device is in the space surrounded by the safety fence.

The above described robot control system preferably includes a disconnection detecting section that detects whether the portable operating device is disconnected from the robot control system and display means that displays a message informing a reader that the portable operating device is disconnected from the robot control system.

This configuration includes a disconnection detecting section that detects whether the portable operating device is disconnected from the robot control system and a display means that displays a message informing the reader that the portable operating device is disconnected from the robot control system. This allows the operator to know whether the portable operating device has been disconnected from the robot control system and automatic operation of the robot continues.

The above described robot control system preferably includes a date/time obtaining section for obtaining a date and time of when the portable operating device was disconnected from the robot control system and/or a charging amount obtaining section for obtaining a charging amount of the second battery at the time when the portable operating device was disconnected. The display means displays at least one of the date/time and the charging amount.

This configuration includes a date/time obtaining section that obtains the date and time of when the portable operating device was disconnected from the robot control system and/or the charging amount obtaining section that obtains the charging amount of the secondary battery at the time when the portable operating device is disconnected from the robot control system. The display means displays at least one of the date/time and the charging amount at the time when the portable operating device is disconnected. This allows the operator to know the specific condition at the time when the portable operating device is disconnected from the robot control system.

In the above described robot control system, the display means is a display section mounted in the charging means.

In this configuration, even if the power source for the portable operating device is disconnected, for example, after the portable operating device has been disconnected from the robot control system, the display section of the charging means allows the operator to know the fact that the portable operating device has been disconnected from the robot control system and the automatic operation continues, and information such as the date/time and the charging amount when the portable operating device was disconnected from the robot control system.

DETAILED DESCRIPTION OF THE PREFERRED EMBODIMENTS

First Embodiment

One embodiment of a robot control system according to the present invention will now be described with reference to FIG. 1.

Figure 1:
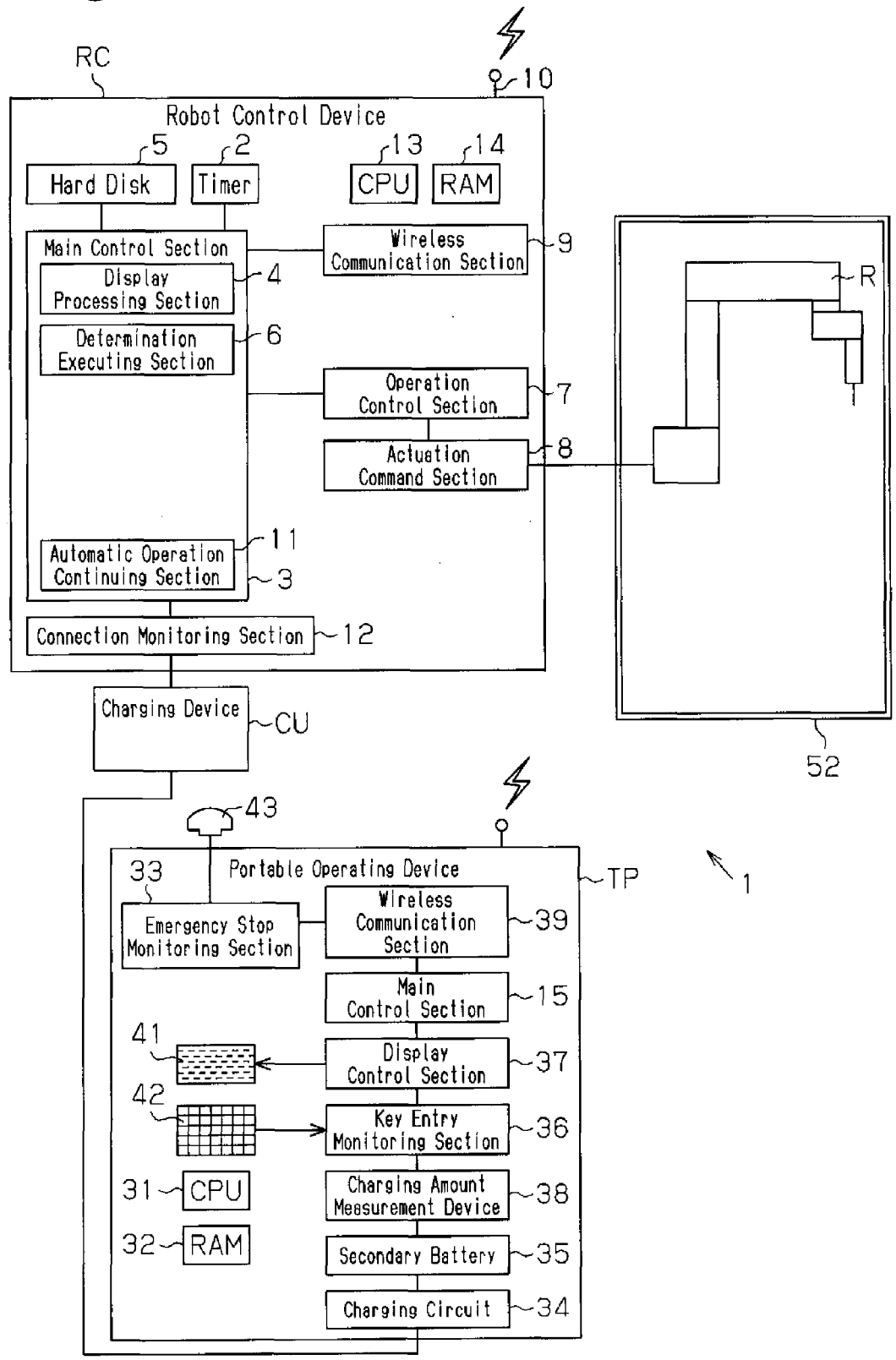
FIG. 1 is a block diagram representing a robot control system according to a first embodiment of the present invention.

As illustrated in FIG. 1, a robot control system 1 includes a robot control device RC for controlling operation of a robot R, the robot R installed in the space surrounded by a safety fence 52, a portable operating device TP for operating the robot R, and a charging device CU for charging the portable operating device TP. Wireless communication can be carried out between the portable operating device TP and the robot control device RC. An emergency stop of the robot R is caused when wireless communication is temporarily interrupted by noise generation or insufficient radio field intensity as the wireless communication is carried out.

The robot control device RC includes a CPU 13 serving as a central processing unit, a RAM 14 serving as a temporary calculation area, a system timer 2, a main control section 3 serving as a control center, a hard disk 5, an operation control section 7, an actuation command section 8, a connection monitoring section 12, a wireless communication section 9, and a transceiver 10. The system timer 2 measures current system time. The hard disk 5 stores teaching data and the like. The operation control section 7 performs track calculation of the robot R and outputs the calculation result to the actuation command section 8 as an actuation signal. The actuation command section 8 outputs a servo control signal for controlling rotation of servomotors of the robot R. The connection monitoring section 12 monitors whether the portable operating device TP and the robot control device RC are electrically connected to each other through the charging device CU. The wireless communication section 9 and the transceiver 10 are used to carry out the wireless communication between the robot control device RC and the portable operating device TP. The CPU 13, the RAM 14, the system timer 2, the main control section 3, the hard disk 5, the operation control section 7, the actuation command section 8, the connection monitoring section 12, the wireless communication section 9, and the transceiver 10 are connected to one another through a non-illustrated bus. Further, the main control section 3 has a display processing section 4, an interpretation executing section 6, and an automatic operation continuing section 11. The display processing section 4 generates display data, which is to be displayed on a display section 41 of the portable operating device TP, as a software program. The interpretation executing section 6 outputs a teaching signal to the operation control section 7 based on teaching data, which is stored in the hard disk 5. When the connection monitoring section 12 detects that the portable operating device TP is not electrically connected to the robot control device RC, the automatic operation continuing section 11 continues the automatic operation of the robot R with the portable operating device TP disconnected from the robot control device RC. The automatic operation continuing section 11 and the connection monitoring section 12 will be described below in further detail.

The portable operating device TP has a CPU 31 serving as a central processing unit, a RAM 32 serving as a temporary calculation area, the display section 41, a keyboard 42, an emergency stop switch 43, an emergency stop monitoring section 33, a display control section 37, a key entry monitoring section 36, a wireless communication section 39, and a transceiver 20. The display section 41 displays various types of information. The keyboard 42 is used to enter various types of data such as teaching data. The emergency stop monitoring section 33 monitors an input of the emergency stop switch 43. The display control section 37 displays the display data on the display section 41. The key entry monitoring section 36 monitors key entry through the keyboard 42. The wireless communication section 39 and the transceiver 20 are used to carry out wireless communication between the robot control device RC and the portable operating device TP. Various types of data entered through the keyboard 42 and a monitoring result indicating whether the emergency stop switch 43 has been pressed are transmitted from the portable operating device TP to the robot control device RC through the wireless communication section 39. The portable operating device TP also includes a charging circuit 34, a secondary battery 35, a main control section 15, and a charging amount measurement device 38. The charging circuit 34 is electrically connected to the charging device CU. This charges the secondary battery 35 so that the portable operating device TP can be operated. The main control section 15 controls all the control sections of the portable operating device TP. The main control section 15 also has a function for automatically disconnecting the power source of the portable operating device TP at a predetermined timing. The charging amount measurement device 38 measures the charging amount of the secondary battery 35 at predetermined time cycles. The measured charging amount is converted into digital data and stored by the RAM 32.

The charging device CU charges the portable operating device TP. The charging device CU supplies power from the robot control device RC to the portable operating device TP. In the first embodiment, by arranging the portable operating device TP at a predetermined position in the charging device CU, the charging circuit 34 is electrically connected to the charging device CU so that the secondary battery 35 in the portable operating device TP is charged. The power source of the charging device CU may be supplied from a commercial power supply, instead of the robot control device RC.

The connection monitoring section 12 and the automatic operation continuing section 11 will hereafter be described.

The connection monitoring section 12 constantly monitors whether electric connection between the portable operating device TP and the robot control device RC is established. When the robot R is in automatic operation and the connection monitoring section 12 detects that the electric connection between the portable operating device TP and the robot control device RC is not established, the connection monitoring section 12 transmits a signal indicating the detection result to the automatic operation continuing section 11. When the portable operating device TP is not connected to the charging device CU, the charging amount of the secondary battery 35 of the portable operating device TP decreases as the time elapses. This eventually ends the wireless communication between the portable operating device TP and the robot control device RC. As a result, an emergency stop signal is input to the robot R and the production line is stopped. However, to prevent the problem, the automatic operation continuing section 11 of the first embodiment carries out the procedure described below.

The automatic operation continuing section 11 ends the wireless communication between the portable operating device TP and the robot control device RC and continues the automatic operation of the robot R solely through the robot control device RC with the portable operating device TP disconnected from the robot control system 1. More specifically, the automatic operation continuing section 11 sends a wireless communication end request signal to the portable operating device TP through the wireless communication section 9. In response to an answer sent from the portable operating device TP to the automatic operation continuing section 11, the automatic operation continuing section 11 requests the wireless communication section 9 to end a wireless communication process. In this manner, the automatic operation continuing section 11 ends the wireless communication between the portable operating device TP and the robot control device RC. Further, the automatic operation continuing section 11 sends a signal for suspending generation of the display data and a process of transmission to the portable operating device TP to the display processing section 4. At this stage, the display processing section 4 may change the destination of transmission from the portable operating device TP to the hard disk 5 without suspending the generation of the display data.

When the robot R is in automatic operation, the robot control device RC may control operation of the robot R based on the teaching data stored in the hard disk 5. Accordingly, when the robot R is in automatic operation, it is unnecessary to cause the robot control device RC and the portable operating device TP to communicate to each other in order to display change of the execution state and variable numbers of the teaching data on the portable operating device TP. In other words, even when wireless communication between the robot control device RC and the portable operating device TP is suspended, the operation of the robot R is controlled without causing a problem. When the portable operating device TP, which is disconnected from the robot control system 1, receives the wireless communication end request signal from the robot control device RC, it is desirable for the portable operating device TP to automatically disconnect the power source of the portable operating device TP.

As has been described, when the robot R is in the automatic operation and it is detected that the electric connection between the portable operating device TP and the robot control device RC is not established, the wireless communication is ended. Further, with the portable operating device TP disconnected from the robot control system 1, the automatic operation of the robot R is continued solely through the robot control device RC without causing an emergency stop of the robot R. In this manner, automatic operation of the robot R is continued regardless of whether the portable operating device RC is connected to the charging device CU. This enhances work efficiency. Further, since automatic operation of the robot R is continued solely through the robot control device R without performing wireless communication, an emergency stop of the robot R caused by communication noise does not occur. Also, the portable operating device TP, which is disconnected from the robot control system 1, may be employed to perform robot teaching in other robot control systems.

When the robot R is in automatic operation and it is detected that an electric connection between the portable operating device TP and the robot control device RC is not established, the charging amount of the portable operating device TP is prevented from falling short by automatically disconnecting the power source of the portable operating device TP.

Second Embodiment

A second embodiment of the present invention will hereafter be described with reference to FIG. 2. Detailed description of components of the second embodiment that are the same as or like corresponding components of the first embodiment will be omitted herein. The second embodiment is configured identically with the first embodiment except for an alarm lamp 23 serving as alarm activation means, a radio field intensity measurement device 25 mounted in the vicinity of the robot R, a connection cable 26, a display section 51 arranged in the charging device CU, a radio field intensity monitoring section 21, an alarm activation section 22, a date/time obtaining section 27, a charging amount obtaining section 28, and a disconnection detecting section 29. The radio field intensity monitoring section 21, the alarm activation section 22, the date/time obtaining section 27, the charging amount obtaining section 28, and the disconnection detecting section 29 are provided in the robot control device RC.

Figure 2:
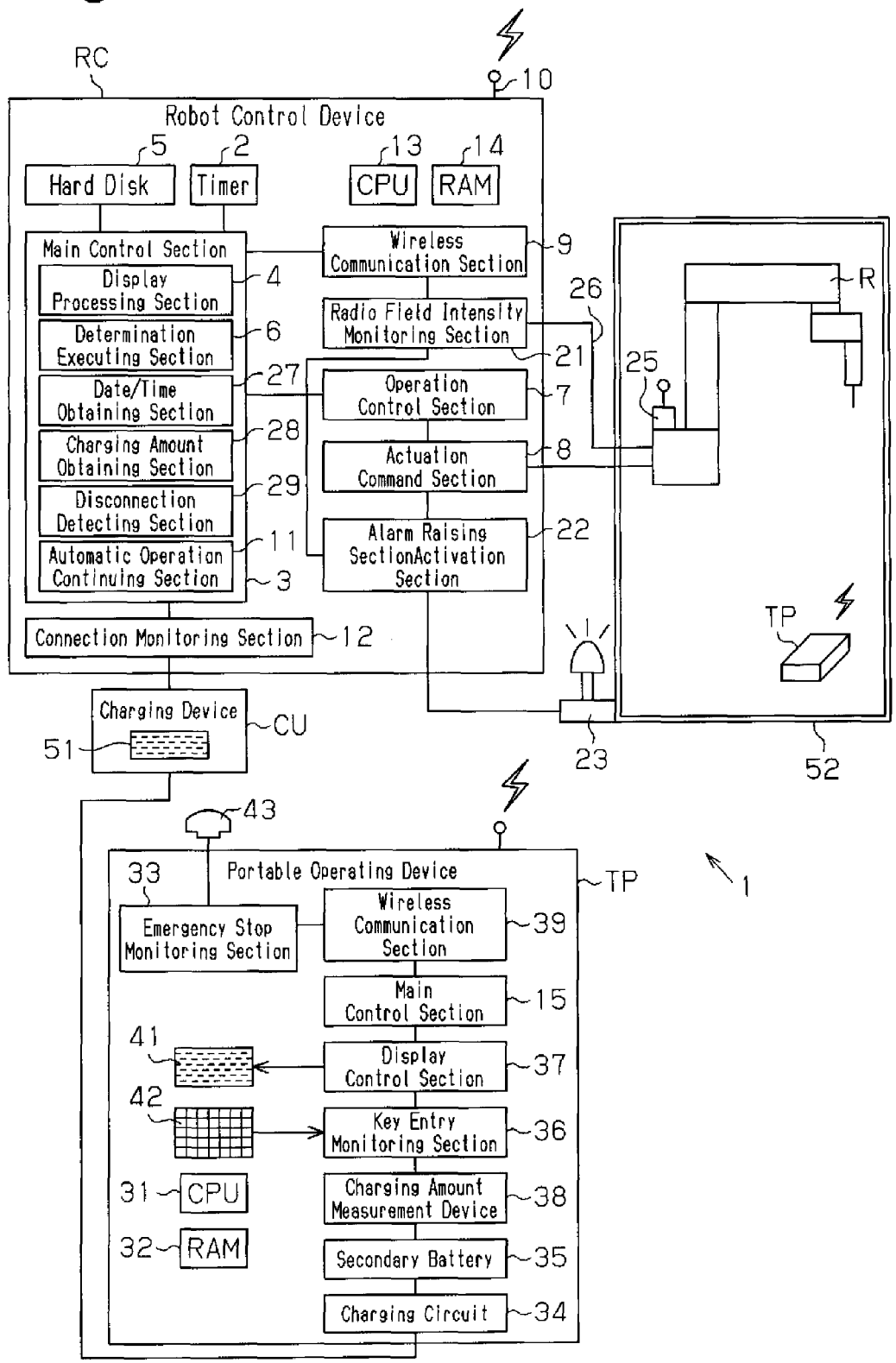
FIG. 2 is a block diagram representing a robot control system according to a second embodiment of the invention.
Figure 3:
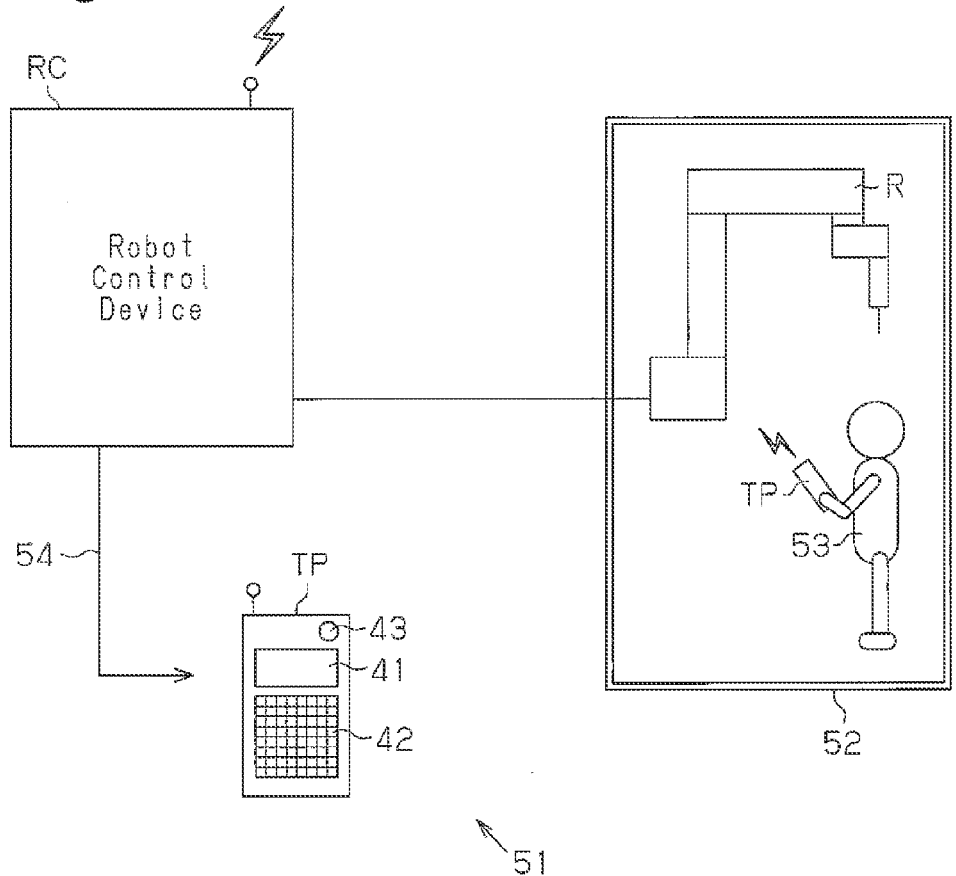
FIG. 3 is a block diagram illustrating the robot control system in which a portable operating device and a robot control device wirelessly communicate with each other.
Figure 4:
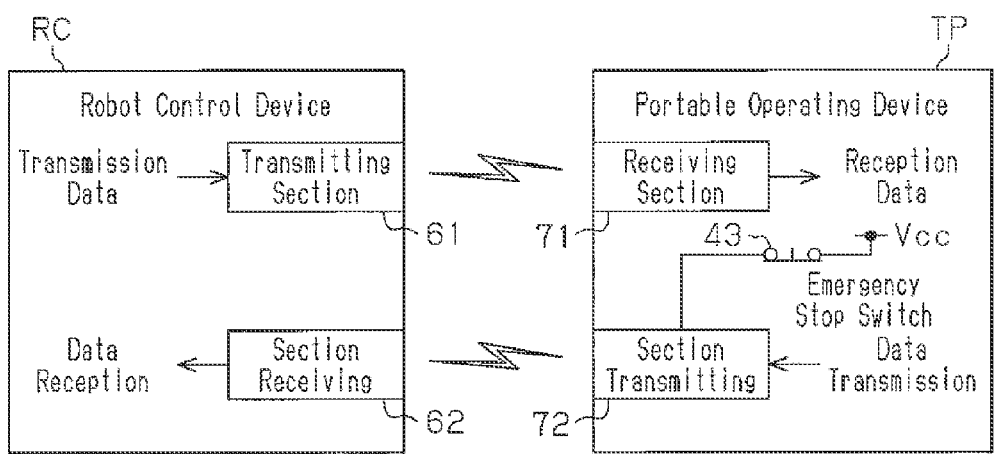
FIG. 4 is a block diagram illustrating wireless communication between the portable operating device and the robot control device.

As illustrated in FIG. 2, the radio field intensity measurement device 25 is arranged in the vicinity or the interior of the robot R or attached to an inner side of the safety fence 52. The radio field intensity measurement device 25 is connected to the radio field intensity monitoring section 21 through the connection cable 26. In the second embodiment, the radio field intensity monitoring section 21, the radio field intensity measurement device 25, and the connection cable 26 are configured as a radio field intensity monitoring means for monitoring the radio field intensity of the portable operating device TP.

The radio field intensity monitoring section 21 determines whether the radio field intensity of the portable operating device TP is greater than a predetermined level. The predetermined level is set to such a minimum level that it allows wireless communication between the portable operating device TP and the robot control device RC in a range substantially covering the entire space surrounded by the safety fence 52. Specifically, when the radio field intensity is smaller than the predetermined level, it is determined that the portable operating device TP is arranged outside the space surrounded by the safety fence 52. In contrast, when the radio field intensity is greater than or equal to the predetermined level, it is determined that the portable operating device TP is arranged in the space surrounded by the safety fence 52.

The alarm activation section 22 turns on the alarm lamp 23 based on a determination result provided by the radio field intensity monitoring section 21. The date/time obtaining section 27 obtains the date and time of when the portable operating device TP was disconnected from the robot control system 1 from the system timer 2 and stores the date/time in the hard disk 5. The charging amount obtaining section 28 inquires the portable operating device TP about the charging amount of the secondary battery 35 at the time when the portable operating device TP is disconnected from the robot control system 1 and stores the result provided by the portable operating device TP in the hard disk 5. The disconnection detecting section 29 detects that the portable operating device TP is disconnected from the robot control system 1 and the automatic operation of the robot R continues.

The display section 51 of the charging device CU displays at least one of the date/time and the charging amount of the secondary battery each at the time when the portable operating device TP is disconnected from the robot control system 1, in addition to a message informing the reader that the portable operating device TP is disconnected from the robot control system 1.

Operation of the second embodiment will hereafter be described. In order to end the wireless communication between the portable operating device TP and the robot control device RC and disconnect the portable operating device TP from the robot control system 1 through the procedure of the automatic operation continuing section 11 of the first embodiment, a pre-procedure as described below is performed.

When the robot R is in automatic operation and the connection monitoring section 12 detects that the electric connection between the portable operating device TP and the robot control device RC is not established, the radio field intensity monitoring section 21 determines whether a measured radio field intensity is greater than a predetermined level. When it is determined that the radio field intensity is lower than the predetermined level, the radio field intensity monitoring section 21 informs the automatic operation continuing section 11 of the determination result. In response, the automatic operation continuing section 11 determines whether the portable operating device TP is outside the space surrounded by the safety fence 52 and continues automatic operation of the robot R in accordance with the same procedure as the procedure of the first embodiment.

Contrastingly, when the measured radio field intensity is greater or equal to the predetermined level, the radio field intensity monitoring section 21 informs the alarm activation section 22 of the result. This causes the alarm activation section 22 to turn on the alarm lamp 23. Specifically, the alarm activation section 22 blinks or illuminates the alarm lamp 23. The alarm lamp 23 may be replaced by an audio device or other light. In this manner, when the portable operating device TP is in the space surrounded by the safety fence, an alarm is first activated to inform the operator of, for example, the fact that the portable operating device TP is in the space surrounded by the safety fence. It is desirable to carry out the procedure described below before and after the wireless communication is ended and automatic operation of the robot R is continued.

The date/time obtaining section 27 obtains the date and time of when the wireless communication has ended and stores the date/time in the hard disk 5. The charging amount obtaining section 28 queries the portable operating device TP about the charging amount of the secondary battery 35 at the time immediately before wireless communication ended and stores the result provided by the portable operating device TP in the hard disk 5. When the disconnection detecting section 29 detects that the portable operating device TP has been disconnected from the robot control system 1 and automatic operation of the robot R continues, the disconnection detecting section 29 outputs a signal instructing display of the obtained date/time or charging amount to the display processing section 4. The display processing section 4 thus displays the date/time or the charging amount of the charging device CU, in addition to the message informing the reader that the portable operating device TP is disconnected from the robot control system 1.

In this manner, by displaying at least one of the date/time and the charging amount at the time when the portable operating device TP has been disconnected from the robot control system 1, the operator is allowed to know that the portable operating device TP has been disconnected from the robot control system 1 and automatic operation of the robot R continues, in addition to specific information such as the date/time or the charging amount at the time when such disconnection occurred.

Further, even if the power source of the portable operating device TP is disconnected after the portable operating device TP has been disconnected from the robot control system 1, the operator is allowed to obtain the aforementioned information at the time when the portable operating device TP was disconnected from the robot control system 1 by means of the display section of the charging device CU.

In the second embodiment of the present invention described above, the transceiver 10 may be mounted in the vicinity or the interior of the robot R, instead of the radio field intensity measurement device 25. In this case, the transceiver 10 and the robot control device RC are connected to each other with a wire and the radio field intensity is measured using the transceiver 10.

The invention claimed is:

1. A robot control system having a robot, a portable operating device that is actuated by a rechargeable secondary battery and used to operate the robot, a robot control device that is capable of wirelessly communicating with the portable operating device and performs automatic operation of the robot based on teaching data input by the portable operating device, and emergency stop means that causes an emergency stop of the robot when wireless communication between the portable operating device and the robot control device is interrupted, the robot control system comprising:

a charging device, wherein the charging device is configured to charge the secondary battery when the portable operating device is electrically connected to the robot control device;

a connection monitoring section configured to monitor whether an electric connection between the portable operating device and the robot control device through the charging device is established;

a disconnection detecting section that detects whether the portable operating device is disconnected from the robot control system;

a date and time obtaining section for obtaining a date and time of when the portable operating device was disconnected from the robot control system;

a charging amount obtaining section for obtaining a charging amount of the secondary battery at the time when the portable operating device was disconnected;

a display means that displays a message informing a reader that the portable operating device is disconnected from the robot control system and that displays at least one of the date and time and the charging amount when the portable operating device was disconnected;

a display processing section, wherein the display processing section generates display data, and wherein the display data is transmitted from the display processing section to a display section of the portable operating device where it is displayed; and an automatic operation continuing section, wherein if the connection monitoring section detects that the electric connection is not established when the robot is in automatic operation, the automatic operation continuing section ends wireless communication without causing an emergency stop of the robot and continues automatic operation of the robot with the portable operating device disconnected from the robot control system;

wherein, in response to the automatic operation continuing section ending wireless communication, the automatic operation continuing section sends a signal to the display processing section for suspending generation of the display data such that the display processing section changes the destination of transmission of the display data from the portable operating device to the robot control device, wherein display data continues to be generated on the robot control device when wireless communication has ended.

2. The robot control system according to claim 1, wherein, if the connection monitoring section detects that the electric connection is not established when the robot is in automatic operation, a power source of the portable operating device is disconnected.

3. The robot control system according to claim 1, wherein the display means is a display section mounted in the charging means.

\* \* \* \* \*

UNITED STATES PATENT AND TRADEMARK OFFICE
CERTIFICATE OF CORRECTION

PATENT NO. : 8,660,690 B2
APPLICATION NO. : 12/864838
DATED : February 25, 2014
INVENTOR(S) : Nobuhiro Tani et al.

It is certified that error appears in the above-identified patent and that said Letters Patent is hereby corrected as shown below:

Title Page, item (73), delete "Toyami" and insert therefor --Toyama--.

Signed and Sealed this
Sixth Day of May, 2014

Michelle K. Lee
*Deputy Director of the United States Patent and Trademark Office*